United States Patent [19]

Haese et al.

[11] Patent Number: 5,545,710
[45] Date of Patent: Aug. 13, 1996

[54] USE OF SPECIAL POLYCARBONATES FOR THE PRODUCTION OF OPTICAL ARTICLES

[75] Inventors: Wilfried Haese, Odenthal; Friedrich Bruder, Krefeld; Ralf Pakull, Pulheim; Jürgen Kirsch, Leverkusen; Hartmut Löwer, Krefeld, all of Germany

[73] Assignee: Bayer Aktiengesellschaft, Leverkusen, Germany

[21] Appl. No.: 496,050

[22] Filed: Jun. 28, 1995

Related U.S. Application Data

[63] Continuation of Ser. No. 304,566, Sep. 12, 1994, abandoned.

[30] Foreign Application Priority Data

May 9, 1994 [DE] Germany .......................... 44 16 325.8
Sep. 12, 1994 [DE] Germany .......................... 43 32 169.0

[51] Int. Cl.$^6$ .................................................. C08G 64/00
[52] U.S. Cl. .......................... 528/201; 528/171; 528/174; 528/196; 528/202; 528/204
[58] Field of Search ...................... 528/201, 171, 528/174, 196, 202, 204; 428/64

[56] References Cited

U.S. PATENT DOCUMENTS 4,767,840  8/1988  Shannon et al. ................... 528/196
4,950,731  8/1990  Faler et al. ........................ 528/201
4,982,014  1/1991  Freitag et al. ..................... 568/721
5,391,693  2/1995  Nakae ............................... 528/201

OTHER PUBLICATIONS

P. W. Morgan, Macromolecules, 3:536–544 (1970).

*Primary Examiner*—James J. Seidleck
*Assistant Examiner*—Terressa M. Mosley
*Attorney, Agent, or Firm*—Connolly & Hutz

[57] ABSTRACT

The present invention provides the use of polycarbonates containing carbonate structural units of the formula (I),

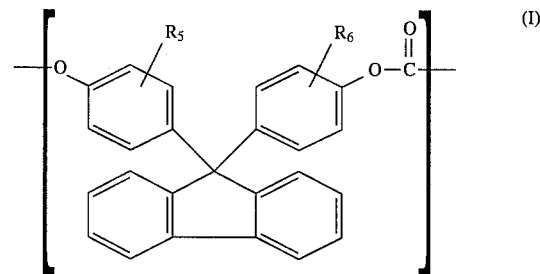

for the production of optical articles, novel polycarbonates, which contain the structural units (I), together with a process for the production of these novel polycarbonates.

8 Claims, No Drawings

USE OF SPECIAL POLYCARBONATES FOR THE PRODUCTION OF OPTICAL ARTICLES

This application is a continuation of application Ser. No. 08/304,566 filed on Sep. 12, 1994 now abandoned.

The present invention provides the use of special polycarbonates for the production of optical articles, which use is characterised in that the special polycarbonates contain difunctional carbonate structural units of the formula (I)

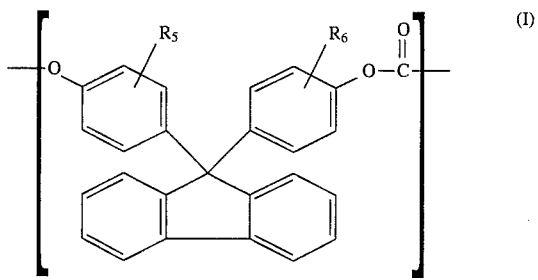

in quantities of 20 mol. % to 90 mol. %, preferably in quantities of 50 mol. % to 80 mol. %, related to the total molar quantity of difunctional carbonate structural units in the polycarbonate,
in which $R_5$ and $R_6$ are identical or different and are H or $C_1$–$C_{12}$ alkyl, for example $CH_3$, preferably in which $R_5$=$R_6$=H.

The complementary quantity of 80 mol. % to 10 mol. %, preferably of 50 mol. % to 20 mol. %, comprises other difunctional carbonate structural units of the formula (II)

in which —O—R—O— is any other desired diphenolate residue, wherein —R— is an aromatic residue with 6 to 30 C atoms, which may contain one or more aromatic rings, may be substituted and may contain aliphatic residues, cycloaliphatic residues or heteroatoms as bridging members.

The polycarbonates according to the invention may be processed into optical articles, for example by extruding the polycarbonates isolated in a known matter into pellets and processing these pellets, optionally after incorporation of additives, by injection moulding.

Polycarbonates prepared from 9,9-bis-(4-hydroxyphenyl)fluorene are known (see for example P. W. Morgan, *Macromolecules*, 3, pages 536–544, 1970 or R. P. Kambour et al., *Journal of Applied Polymer Science*, vol. 20, pages 3275–3292 (1976) and R. P. Karobout et al., *J. Polym. Sci., Polymer Letters Edition*, vol. 16, pages 327–333 (1978)).

Optical articles pursuant to the present invention are in particular those having or requiring extremely low birefringence, thus, for example, lenses, prisms, optical data storage media, compact discs, but in particular repeatedly readable and re-writable optical data storage media for the storage of optical information.

Polycarbonates with low birefringence are, for example, known from G. Kämpf et al., *Polymer Preprints* 29 (1988), pages 209 & 210. However, this publication contains no reference to the subject matter of the present invention.

EP 0 177 713 describes special polycarbonates and the use thereof as optical disks, which polycarbonates contain structural units of the formula (III)

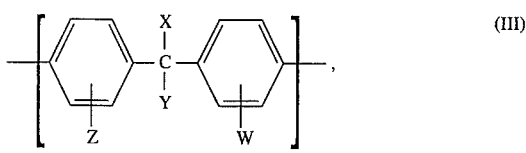

in which at least one of the residues X and Y is aryl or aralkyl with 6 to 12 C atoms.

Bis-(4-hydroxyphenyl)diphenylmethane is cited by way of example for the formation of (III) (page 5, line 22 of EP 0 177 713).

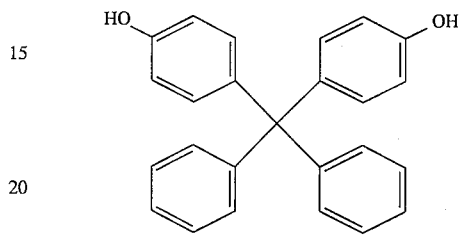

The polycarbonates according to EP 0 177 713 have a series of good properties which make them suitable for optical purposes (page 9, lines 19 et seq.). In comparison with the polycarbonates to be used according to the invention containing difunctional units of the formula (I), their birefringence is still too high. For example, the birefringence of the polycarbonate prepared from bis(4-hydroxyphenyl)diphenylmethane is still approximately 15% of that of bisphenol A polycarbonate (table 1 from: *Japanese Journal of Applied Physics*, vol. 29, n° 5, May 1990, pages 898–901).

EP-A-0 287 887 describes polycarbonates based on 6,6'-dihydroxy-3,3,3',3',-tetramethyl-1,1'-spiro(bis)indan. While it is indeed possible to produce materials from this compound with very low optical birefringence, it is, however, possible only if the spirobisindanbisphenol content is very high (see table (III) of the EP-A or also the comparative examples). However, this makes this polycarbonate very brittle and difficult to process.

Bis-(4-hydroxylphenyl)diphenylmethane may inter alia also be used as an additional diphenol (page 3, line 48).

The object of the present invention was thus to provide special polycarbonates for the production of optical articles, which may readily be processed into optical articles and furthermore produce optical articles with low birefringence and good mechanical properties.

This is particularly the case if structural units of the formula (IV) are present in the complementary quantities as the structural units of the formula (II)

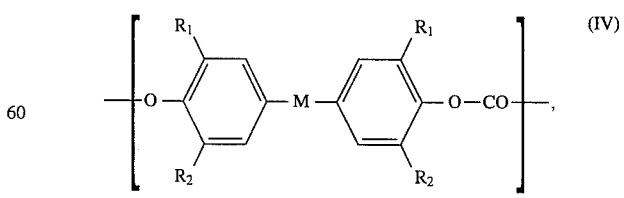

in which
M is a $C_1$–$C_8$ alkylene, a $C_2$–$C_8$ alkylidene, a $C_5$–$C_{10}$ cycloalkylidene, —S— and a single bond and in which $R_1$ and $R_2$ are identical or different and are $CH_3$, Cl, Br or H.

Examples of the diphenols (IVa) on which the structural units (IV) are based

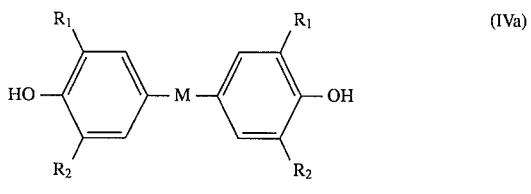

(IVa)

in which M and $R_1$ and $R_2$ have the meaning stated for (IV), are 4,4'-dihydroxydiphenyl, 2,2-bis-(4-hydroxyphenyl)propane, 2,4-bis-(4-hydroxyphenyl)-2-methylbutane, 2,2-bis-(3-methyl-4-hydroxyphenyl)propane, 2,2-bis-(3-chloro-4-hydroxyphenyl)propane, bis-(3,3-dimethyl-4-hydroxyphenyl)methane, 2,2-bis-(3,5-dimethyl-4-hydroxyphenyl)propane, 2,4-bis-(3,5-dimethyl-4-hydroxyphenyl)-2-methylbutane, 2,2-bis-(3,5-dichloro-4-hydroxyphenyl)propane, 2,2-bis(3,5-dibromo-4-hydroxyphenyl)propane, 1,1-bis-(4-hydroxyphenyl)-3,3,5-trimethylcyclohexane and 1,1-bis-(4-hydroxyphenyl)cyclohexane.

Preferred diphenols (Iva) are 2,2-bis-(4-hydroxyphenyl)propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane, 1,1-bis-(4-hydroxyphenyl)cyclohexane and 1,1-bis-(4-hydroxyphenyl)-3,3,5-trimethylcyclohexane.

Both the diphenols (IIa)

HO—R—OH    (IIa)

in general, in which R has the meaning stated for formula (II), and the specific diphenols (IVa) may be used individually or in combination to produce the copolycarbonates to be used according to the invention with structural units of the formula (I).

The polycarbonates to be used according to the invention with the structural units of the formula (I) have average molecular weights $\overline{M}_w$ (weight average, determined by gel chromatography after prior calibration) of at least 9,000, in particular of 9,500 to 120,000, preferably of 10,000 to 60,000; they have a glass transition temperature of above 150° C.

The polycarbonates to be used according to the invention with the structural units of the formula (I) have the customary phenyl or alkylphenyl terminal groups at the end of the molecular chains, which groups are produced in a known manner during polycarbonate synthesis with phenol or alkylphenols as chain terminators.

The polycarbonates to be used according to the invention with the structural units of the formula (I) may also be branched, which proceeds in a known manner by incorporation of tri- or higher functional compounds. They may additionally contain customary additives incorporated in them such as mould release agents, UV stabilisers and heat stabilisers.

Some of the polycarbonates to be used according to the invention with the structural units of the formula (I) are still novel, namely those which contain structural units of the formula (V) as the complementary structural units (II),

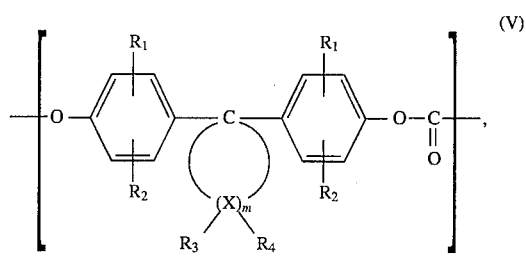

(V)

in which $R_1$ and $R_2$ have the meaning stated for formula (IV), "m" is 4 or 5 and $R_3$ and $R_4$, independently for each X and also mutually independently, are H or $CH_3$ and in which X is a carbon atom.

These polycarbonates are produced from the diphenols (Ia)

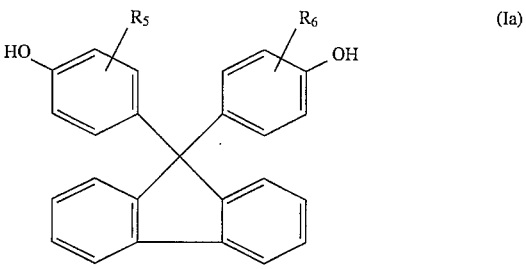

(Ia)

in which $R_5$ and $R_6$ have the meaning stated for formula (I), and the diphenols (Va)

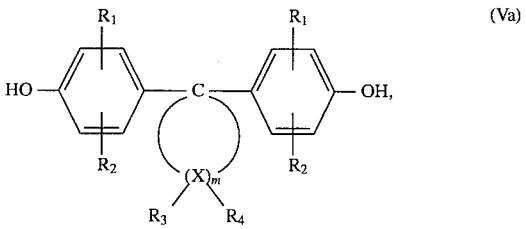

(Va)

in which $R_1$, $R_2$, $R_3$, $R_4$, X and "m" have the meaning stated for formula (V), in quantity ratios of (Ia) to (Va) of between 20 mol. %:80 mol. % and 90 mol. %:10 mol. %, preferably between 50 mol %:50 mol % and 80 mol %:20 mol. %, using known processes, as are for example most comprehensively described for the person skilled in the art in U.S. Pat. No. 4,982,014 (Le A 26 344-US) or in DE-OS 38 32 396 (Le A 26 344).

The present invention thus also provides thermoplastic, aromatic polycarbonates with $\overline{M}_w$ (weight average molecular weight measured by gel chromatography after prior calibration) of at least 9,000, in particular of 9,500 to 120,000 and preferably of 10,000 to 60,000, which are characterised in that they contain difunctional carbonate structural units of the formula (I) in quantities of 20 mol. % to 90 mol. %, preferably of 50 mol. % to 80 mol. %, related to the total molar quantity of difunctional carbonate structural units in the polycarbonate, and difunctional carbonate structural units of the formula (V) in quantities of 80 mol. % to 10 mol. %, preferably of 50 mol. % to 20 mol. %, again related to the total molar quantity of difunctional carbonate structural units in the polycarbonate, wherein the sum of structural units (I) and (V) is 100 mol. % in each case.

These novel polycarbonates, which contain the customary arylene terminal groups and may be branched, may additionally contain customary additives such as mould release agents, UV stabilisers, heat stabilisers or flame retardants, and in fact in the quantities customary for thermoplastic polycarbonates.

The present invention thus also provides a process for the production of polycarbonates from the difunctional structural units of the formulae (I) and (V), which is characterised in that the diphenols (Ia) in quantities of 20 mol. % to 90 mol. %, preferably of 50 mol. % to 80 mol. %, together with the diphenols (Va) in quantities of 80 mol. % to 10 mol. %, preferably of 50 mol.% to 20 mol. %, related in each case to 100 mol. % of diphenols (Ia) and (Va), are reacted in a known manner in the presence of chain terminators and, optionally, branching agents, with phosgene or with diphenyl carbonate.

A proportion of the special diphenols (Va) may, however, also be replaced with other diphenols of the common structure (IIa), preferably by those already cited on page 5 of this application: 4,4'-dihydroxydiphenyl, 2,2-bis-(4-hydroxyphenyl)propane, 2,4-bis-(4-hydroxyphenyl)-2-methylbutane, 2,2-bis-(3-methyl-4-hydroxyphenyl)propane, 2,2-bis-(3-chloro-4-hydroxyphenyl)propane, bis-(3,3-dimethyl-4-hydroxyphenyl)methane, 2,2-bis-(3,5-dimethyl-4-hydroxyphenyl)propane, 2,4-bis-(3,5-dimethyl-4-hydroxyphenyl)- 2-methylbutane, 2,2-bis-(3,5-dichloro-4-hydroxyphenyl)propane, 2,2-bis-(3,5-dibromo-4-hydroxyphenyl)propane and 1,1-bis-(4-hydroxyphenyl)cyclohexane.

The proportion of other diphenols of the common structure (IIa) should amount to up to two thirds of the particular molar percentage of diphenols (Va) used, preferably up to half of the particular molar percentage of diphenols (Va) used and in particular up to one third of the particular molar percentage of diphenols (Va) used.

The present invention thus also provides a process for the production of polycarbonates from the difunctional structural units of the formulae (I) and (V), wherein up to two thirds, preferably up to half and in particular up to one third of the structural units (V) may be replaced with other structural units of the common formula (II), which process is characterised in that the diphenols (Ia) in quantities of 20 mol. % to 90 mol. %, preferably of 50 mol. % to 80 mol. %, together with diphenols (Va) in quantities of 80 mol. % to 10 mol. %, preferably of 50 mol. % to 20 mol. %, related in each case to 100 mol. % of diphenols (Ia) and (Va), are reacted in a known manner in the presence of chain terminators and, optionally, branching agents, with phosgene or with diphenyl carbonate, wherein up to two thirds, preferably up to half and in particular up to one third of the molar percentage of diphenols (Va) may be replaced with other diphenols of the common structure (IIa).

In these cases, the total molar quantities of diphenols (Va) and other diphenols (IIa) are thus again between 80 mol. % and 10 mol. %, preferably between 50 mol. % and 20 mol. %.

The present invention moreover provides the copolycarbonates obtainable according to the preceding process.

The novel polycarbonates may be isolated in a known manner and processed in known machinery into various mouldings, in particular also into the initially mentioned optical articles, namely lenses, prisms, optical data storage media and the like.

The novel polycarbonates may naturally also be cast into films or extruded into double-walled sheets, which are used in electrical engineering and construction.

EXAMPLES 1 to 7

The following copolycarbonates were produced and their rheooptical constants measured:

TABLE 1

| Example | Fluorenone-bisphenol (g) | Bisphenol A (g) | Molar ratio (mol/mol) | Methylene chloride (g) | Water (g) |
|---|---|---|---|---|---|
| 1 | 21.9 | 42.8 | 25:75 | 1352 | 1352 |
| 2 | 43.8 | 28.5 | 50:50 | 1498 | 1498 |
| 3 | 61.32 | 17.1 | 70:30 | 1614 | 1614 |
| 4 | 65.7 | 14.3 | 75:25 | 1643 | 1643 |

Production of Copolycarbonates a g of 9,9-bis-(4-hydroxyphenyl)fluorene (fluorenonebisphenol) (from table 1)

b g of hisphenol A (from table 1) (the sum of the bisphenols is 0.25 mol)

112.2 g of potassium hydroxide and c g of water (from table 1)

are stirred together and dissolved under inert gas. Then, d g of methylene chloride (from table 1) are added. At pH 11 to 14 and 20° to 25° C., 61.8 g of phosgene were introduced into the thoroughly stirred solution at a rate of approximately 2 g/min. 1.16 g of isooctylphenol and 0.425 g of N-ethylpiperidine were then added and the mixture stirred for a further 45 minutes. The solution containing no bisphenolate was separated, the organic phase acidified and then washed with water until neutral and the solvent eliminated.

The polycarbonates obtained have relative solution viscosities in the range 1.2 to 1.3.

Comparative Examples

The following copolymers based on 6,6'-dihydroxy- 3,3,3',3',-tetramethyl-1,1'-spiro(bis)indan (spirobisindan) were synthesised and their properties measured:

| Comparative examples | Molar ratio (spirobisindan/bisphenol A) |
|---|---|
| 5 | 50:50 |
| 6 | 75:25 |
| 7 | 90:10 |

Synthesis of 6,6'-dihydroxy-3,3,3',3',-tetramethyl-1,1'-spiro(bis)indan (spirobisindan) and of the corresponding polymers is, for example, described in EP 287 887.

Determination of birefringence:

In order to determine the rheooptical constant C, the polymer is oriented by applying a uniaxial tensile stress $\Delta\sigma$ to a hot molten tape.

A heated plunger injector with an appropriate slot die is used to produce the test pieces. If possible, the melt temperature is initially adjusted such that the viscosity is between $7 \times 10^3$ and $1.5 \times 10^4$ Pa.s. Drawing off the tape upwards with a winding motor allows the controlled stretching of the tape in the hot zone above the slot die. A certain constant tensile force F is used to draw off the tape.

Due to the uniaxial, incompressible stretching flow which arises under the action of the tensile force F, the cross-sectional area A of the tape decreases as the distance from the die increases. However, the melt is simultaneously cooling very rapidly, such that the entire orientation process ceases at the latest at the glass transition temperature and the orientation is frozen in. Various degrees of orientation may be produced by applying drawing off forces of differing magnitudes.

Once the tape has cooled, the cross-sectional area A may be determined. In conjunction with the tensile force F, the tensile stress $\Delta\sigma$ may be obtained using $\Delta\sigma=F/A$. Using a Babinet's compensator, the optical path difference T through the tape thickness d is determined with white light. The specific path difference $\Delta n$ may then be calculated from $\Delta n=T/d$. On the basis of the relation $\Delta n=C*\Delta\sigma$, the rheooptical constant C, in units l/Pa, is calculated by linear regression of the point pairs ($\Delta\sigma$, $\Delta n$). Rheooptical constants with a value of less than $10*10^{-11}$ (l/Pa) are no longer accurately measurable using the stated method.

| Example | Rheooptical constant (1/Pa) |
|---|---|
| 1 | $160 * 10^{-11}$ |
| 2 | $42 * 10^{-11}$ |
| 3 | $19 * 10^{-11}$ |
| 4 | $(-10 \text{ to } +10) * 10^{-11}$ |
| Comparative example | |
| 5 | $140 * 10^{-11}$ |
| 6 | $4.6 * 10^{-11}$ |
| 7 | $(-10 \text{ to } +10) * 10^{-11}$ |

EXAMPLES 8 to 10

| Examples | Fluorenone-bisphenol (g) | Bisphenol TMC (g) | Molar ratio (mol/mol) | Methylene-chloride (g) | Water (g) |
|---|---|---|---|---|---|
| 8 | 21.9 | 58.2 | 25:75 | 1646 | 1646 |
| 9 | 56.9 | 27.2 | 65:35 | 1728 | 1728 |
| 10 | 61.3 | 23.3 | 70:30 | 1786 | 1786 |

The abbreviation bisphenol TMC stands for 1,1-bis-(4-hydroxyphenyl)-3,3,5-trimethylcyclohexane.

The copolycarbonates were produced by the method described for Examples 1–4 on page 11.

The determination of birefringence by the method described on page 12 revealed the following values for the rheooptical constant:

| Example | rheooptical constant (1/Pa) |
|---|---|
| 8 | $155 * 10^{-11}$ |
| 9 | $(-10 \text{ bis } +10) * 10^{-11}$ |
| 10 | $-22 * 10^{-11}$ |

We claim:

1. Polycarbonates consisting essentially of difunctional carbonate structural units of the formula (I)

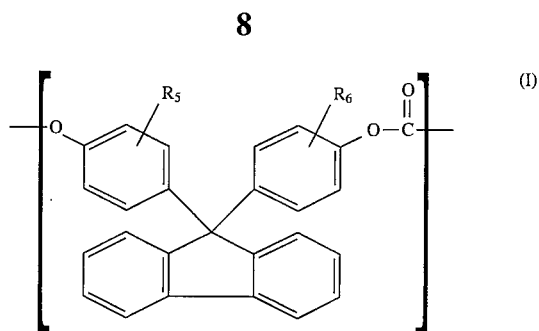

in quantities of 50 mol. % to 80 mol. %, based on the total molar quantity of difunctional carbonate structural units in the polycarbonate, in which $R_5$ and $R_6$ are identical or different and are H or $C_1$–$C_{12}$ alkyl, and which contain structural units of the formula (V)

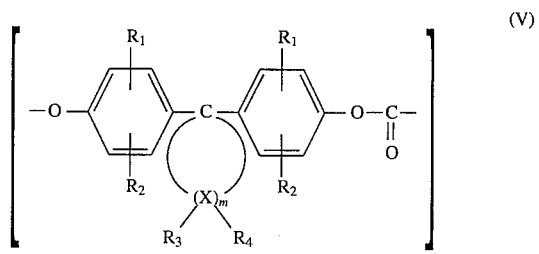

in which $R_1$ and $R_2$ are identical or different and are $CH_3$, Cl, Br or H, "m" is 4 or 5 and $R_3$ and $R_4$, independently for each X and also mutually independently, are H or $CH_3$ and in which X is a carbon atom, the structural units (V) being present in amounts of 50 mol. % to 20 mol. %, based on the total molar quantity of difunctional carbonate structural units in the polycarbonate, and wherein the sum of structural units (I) and (V) is 100%.

2. Polycarbonates consisting essentially of difunctional carbonate structural units of the formula (I)

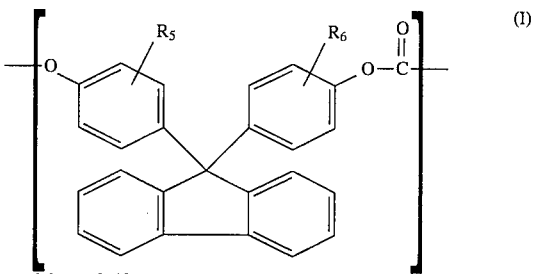

in quantities of 50 mol. % to 80 mol. %, based on the total molar quantity of difunctional carbonate structural units in the polycarbonate, in which $R_5$ and $R_6$ are identical or different and are H or $C_1$–$C_2$ alkyl, and which contain structural units of the formula (V)

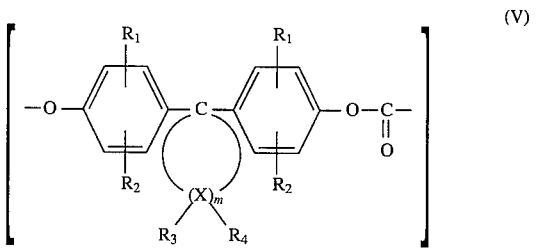

in which $R_1$ and $R_2$ are identical or different and are $CH_3$, Cl, Br or H, "m" is 4 or 5 and $R_3$ and $R_4$, independently for each X and also mutually independently, are H or CH$_3$ and in which X is a carbon atom, the structural units (V) being present in amounts of 50 mol. % to 20 mol. %, based on the total molar quantity of difunctional carbonate structural units in the polycarbonate, and in which up to two thirds of the structural units (V) can be replaced with other structural units of the common formula (II)

(II)

in which —O—R—O— is the diphenolate residue of 2,2-bis-(4-hydroxyphenyl)-propane.

3. An optical article comprised of the polycarbonate as claimed in claim 1.

4. An optical article comprised of the polycarbonate as claimed in claim 2.

5. The optical article of claim 3, the article consisting of a lens, prism, optical data storage media, or compact disc.

6. The optical article of claim 5 wherein the article is an optical data storage media.

7. The optical article of claim 4, the article consisting of a lens, prism, optical data storage media, or compact disc.

8. The optical article of claim 7 wherein the article is an optical storage media.

* * * * *